United States Patent [19]

Rayburn

[11] Patent Number: 4,942,610

[45] Date of Patent: Jul. 17, 1990

[54] CAPACITIVE STRUCTURE

[76] Inventor: Charles C. Rayburn, 124 Sunset Ridge, Forest, Va. 24551

[21] Appl. No.: 331,148

[22] Filed: Mar. 31, 1989

[51] Int. Cl.$^5$ ............................ H01G 1/14; H01G 4/06
[52] U.S. Cl. ...................................... 361/309; 361/323
[58] Field of Search ............... 29/25.42; 361/308–310, 361/328, 330, 323, 311–313

[56] References Cited

U.S. PATENT DOCUMENTS

| | | | |
|---|---|---|---|
| 2,797,373 | 6/1957 | Peck | 29/25.42 X |
| 3,215,909 | 11/1965 | Schill et al. | 361/323 X |
| 4,752,856 | 6/1988 | Rayburn | 361/309 |

Primary Examiner—Donald A. Griffin
Attorney, Agent, or Firm—Thomas Buckman

[57] ABSTRACT

A capacitive structure, in which thermal stresses tending to delaminate its capacitive layers tend to be substantially relieved before such layers delaminate. The capacitive structure is divided into an upper substructure and a lower substructure, each comprising a plurality of capacitive layers, a separating layer being sandwiched between such substructures. The upper substructure comprises an underlying layer of dielectric material. The lower substructure comprises an overlying layer of dielectric material. The separating layer is provided by spraying a colloidal suspension of polytetrafluoroethylene in a liquid carrier containing a suitable binder onto one surface of one of such overlying and underlying layers. The separating layer bonds less aggressively to at least one of the substructures than the substructures would bond to each other if the separating layer were omitted.

16 Claims, 1 Drawing Sheet

CAPACITIVE STRUCTURE

TECHNICAL FIELD OF THE INVENTION

This invention pertains to an improved capacitive structure of a type comprising a group of capacitive layers, each of which includes a dielectric substrate and a metallized area on one surface of the dielectric substrate and which are arranged such that the metallized areas on alternate layers extend to opposite edges of the capacitive structure, and opposed masses of conductive material, each of which covers one such edge of the capacitive structure and provides electrical connections to the metallized areas extending to the same edge. A capacitive property is exhibited where the metallized areas overlie one another.

BACKGROUND OF THE INVENTION

Capacitive structures of the type noted above are exemplified in U.S. Pat. Nos. 4,462,062, 4,448,340 and U.S. Pat. No. 4,531,268. These patents disclose that such a capacitive structure may be advantageously made by winding, in overlying relation on a drum, two webs of polymeric film, each providing a dielectric substrate. Each web of such film has a metallized coating on its upper surface, except for a narrow, longitudinal, demetallized zones, which may be scribed by laser means, and which divides the metallized coating into a relatively wide metallized area extending to and along one edge and a relatively narrow metallized strip extending to and along the other edge. The webs, which are of equal width, are offset laterally such that, as the webs are slit into parallel ribbons of uniform width before being wound on the drum, alternate ones of the successive layers of the overlying ribbons have their edges offset laterally in relation to the remaining layers. The resultant structure, which is called a "rope" because it has a tendency to be somewhat limp, is compressed at an elevated temperature so as to form a more rigid structure, which is called a "stick". A conductive, metallic mass, which typically is constituted by successive layers, e.g. an inner layer of aluminum applied by a metal-spraying process, a middle layer of copper applied by a metal-spraying process, and an outer layer of eutectic tin and lead solder applied by a dipping process, covers each edge of the overlying ribbon so as to provide electrical contacts to and between the metallized areas extending to and along such edge. The stick is sawed into discrete capacitors. In each capacitor, the conductive, metallic masses serve as electrodes, and a capacitive property is exhibited where the relatively wide metallized areas of the successive layers overlie one another. For further background, reference may be had to U.S. Pat. No. 3,670,378 and U.S. Pat. No. 4,229,865, which disclose other examples of capacitive structures of the type noted above.

Although capacitive structures of the type noted above as known heretofore have performed well in many applications, cracking can occur in their manufacture and in subsequent operations, particularly in capacitive structures more than approximately 0.1 inch thick. Cracking can introduce unwanted variability in the capacitive properties of such structures. Usually, when cracking occurs, a microscopic or macroscopic separation occurs between two layers of such a capacitive structure. Usually, such separation occurs between two central layers of the capacitive structure, at one of its sawed ends or at both of its sawed ends, whereby an unwanted cavity is formed in which ionic contaminants or other conductive contaminants can accumulate, which can reduce the dielectric resistance of the capacitive structure. Furthermore, some layers of the capacitive structure may break along a breaking line tending to be generally perpendicular to such separation, whereby the capacitance of the capacitive structure is reduced in an uncontrolled manner. Although there is no intention to be herein bound to any particular theory, it is believed that cracking occurs because opposite edges of the respective layers of metallized polymeric film are locked into the conductive, metallic masses providing electrical contacts, when the capacitive structures are subjected to thermal excursions, as explained below.

Typically, the discrete capacitors are heated to approximately 215° C. for thermal normalization, then cooled. Cracking (when it occurs) is observed when the discrete capacitors cool. Typically, the inner layers of the metallic masses noted above are aluminum, which expands at a rate of approximately $25 \times 10^{-6}$ cm/cm/°C. Typically, the polymeric film is a polyester film, such as a poly(ethylene terephthalate) film, which expands at a rate of approximately $17 \times 10^{-6}$ cm/cm/°C. Aluminum has a thermal conductivity of approximately 2.37 watts/cm/°C. as compared to poly(ethylene terephthalate) film, which has a thermal conductivity of approximately $1.54 \times 10^{-3}$ watts/cm/°C. Thus, each of the electrical contacts has a higher thermal conductivity and expands at a greater rate, as compared to the layers of metallized polymeric film. Consequently, the electrical contacts tend to separate the layers of metallized polymeric film before such layers expand. Furthermore, as cooling occurs, the electrical contacts tend to contract while the layers of metallized polymeric film tend to remain expanded. The outer layers of metallized polymeric film tend to cool before the inner layers cool, whereby the outer layers tend to form a rigid structure, to which the inner layers tend to conform as the inner layers cool. Since the upper, outer layers of metallized polymeric film, and the lower, outer layers of metallized polymeric film tend to compete for adherence of the inner layers of metallized polymeric film, the inner layers of metallized polymeric film thus tend to separate from each other, so as to form a crack.

A polyester film, such as a poly(ethylene terephthalate) film, is partially crystalline and tends to continue to crystallize with each temperature excursion. As such film continues to crystallize, such film tends to shrink. Such shrinkage tends to progress from the outer layers toward the inner layers and to contribute to cracking as discussed above.

Cracks seem to be also attributable to thermal expansion of adsorbed gases at metallized surfaces of the layers of metallized polymeric film. When the discrete capacitors are manufactured, and again when the discrete capacitors are soldered to substrates, the discrete capacitors can experience temperature changes from about 300K to about 500K, whereby such gases expand by a factor of 1.66 at constant pressure. While the expanding gases tend to separate the respective layers, the outer layers tend to cool before the inner layers cool and to form rigid, expanded structures, to which the inner layers tend to remain attached. Finally, as the central layers cool, a crack tends to form, which is bounded by concave surfaces of the layer of metallized polymeric film on opposite sides.

Because the respective layers tend to be well laminated, i.e., well adhered from layer to layer, very high forces are required to separate such layers. Sometimes, a crack steps through several layers before continuing between two adjacent layers. Such a step-form crack, which requires polymeric film layers to be sheared, demonstrates that such high forces tending to cause cracking are exerted. Frequently, a crack runs the entire width of a discrete capacitor and is sufficiently wide to allow light to pass through the crack, as may be easily seen under low magnification, possibly without any magnification. Cracks as wide as approximately 0.003 inch have been observed in discrete capacitors having a nominal thickness of approximately 0.16 inch. Occasionally, small cracks occur in the outer layers of such a structure, perhaps due to other crack-producing mechanisms.

Accordingly, there has been a need, to which this invention is addressed, for an improved capacitive structure, in which unwanted variability due to cracking is minimized.

SUMMARY OF THE INVENTION

Accordingly, this invention provides a capacitive structure of the type noted above, in which thermal stresses tending to cause some of its capacitive layers to delaminate from one another tend to be substantially relieved before any of such layers delaminate from one another.

The capacitive structure provided by this invention comprises an upper substructure and a lower substructure. Each substructure comprises a plurality of capacitive layers laminated in stacked relation to one another. Each capacitive layer includes a dielectric substrate and a metallized area, which covers a major portion of one surface of the dielectric substrate of such capacitive layer, and which extends only to one of its first and second edges. The metallized areas on alternate ones of the capacitive layers in each substructure extend to opposite edges. The first edges of alternate ones of the capacitive layers in each substructure extend beyond the first edges of the remainder of the capacitive layers in such substructure so as to form indentations along the first edges of such substructure. The second edges of alternate ones of the capacitive layers in each substructure extend beyond the second edges of the remainder of the capacitive layers of such substructure so as to form indentations along the second edges of such substructure.

Moreover, at least one separating layer is sandwiched between the upper and lower substructures. Each such separating layer is made of a material bonding less aggressively to at least one of the upper and lower substructures than the upper and lower substructures would bond to each other if each such separating layer were omitted. Preferably, and particularly but not exclusively, if the adjoining layers (between which the separating layer is sandwiched) are made of dielectric, polyester film, such as dielectric, poly(ethylene terephthalate) film, whether or not either of the adjoining layers has a metallized area on its surface facing the separating layer, the separating layer contains polytetrafluoroethylene, which bonds negligibly (if at all) to such a film. The separating layer may be conveniently applied by spraying a colloidal suspension of polytetrafluoroethylene in a liquid carrier containing a suitable binder. A discrete layer containing polytetrafluoroethylene at least at its opposite surfaces, such as a film containing or consisting essentially of polytetrafluoroethylene, may be alternatively used as the separating layer.

In a less preferred embodiment, the separating layer is a discrete layer containing polytetrafluoroethylene at least at its opposite surfaces, such as a film containing or consisting essentially of polytetrafluoroethylene, as disposed between an underlying one of the capacitive layers of the upper substructure and an overlying one of the capacitive layers of the lower substructure. In the less preferred embodiment, one of the adjoining layers (between which the separating layer is sandwiched) can have a metallized area on its surface facing the separating layer.

In a more preferred embodiment, the upper substructure comprises an underlying layer of dielectric, polyester film, preferably dielectric, poly(ethylene terephthalate) film, and the lower substructure includes an overlying layer of similar film. Also, the separating layer is a discrete layer containing polytetrafluoroethylene, as mentioned above, and is sandwiched between the underlying layer of the upper substructure and the overlying layer of the lower substructure. The underlying layer of the upper substructure and the overlying layer of the lower substructure may be a single piece, such as a flattened tube of such film, in a suitable width when flattened, or a folded piece of such film, in a suitable width when folded.

It is contemplated that the separating layer may be merely sandwiched between the dielectric substrate of a capacitive layer of one such substructure and an intervening layer of dielectric material, such as an underlying layer or an overlying layer as noted above, the intervening layer being sandwiched between the separating layer and the capacitive layers of one of the substructures. The separating layer may be conveniently provided by a thin coat applied by spraying, as noted above, or otherwise, to one surface of the intervening layer. Preferably, if a metallized surface of one of the capacitive layers would be otherwise exposed to a crack along the separating layer, the intervening layer covers the metallized surface.

In a most preferred embodiment, which is a refinement of the more preferred embodiment described above as comprising an overlying layer and an underlying layer, the separating layer is provided by a thin coat applied by spraying, as mentioned above, or otherwise to one surface of the underlying layer of the upper substructure or to one surface of the overlying layer of the lower substructure. Even if other materials are used for an underlying layer of the upper substructure and for an overlying layer of the lower substructure, and even if another material is used for the separating layer, it is advantageous to provide the separating layer by a thin coat applied by spraying, as mentioned above, or otherwise to one surface of an underlying layer of the upper substructure or to one surface of an overlying layer of the lower substructure, rather than to provide a discrete layer as the separating layer.

Furthermore, the capacitive structure provided by this invention comprises a first mass of conductive material covering and extending into the indentations formed along the first edges of the capacitive layers of the upper and lower substructures, so as to provide electrical connections to and between the metallized areas extending to the first edges of the capacitive layers of the upper and lower substructures, and a second mass of conductive material covering and extending into the indentations formed along the second edges of the capacitive layers of the upper and lower substructures, so as to provide electrical connections to and between the metallized areas extending to the second edges of the capacitive layers of the upper and lower substructures. The masses of conductive material bond the capacitive layers of each substructure to one another and bond the upper and lower substructures to each other with the separating layer sandwiched between such substructures. Conductive, metallic masses, as discussed above, may be advantageously used for the masses of conductive material of the capacitive structure provided by this invention.

During and following thermal normalization, the capacitive structure provided by this invention tends to crack preferentially between the separating layer and the adjacent layer, or between the separating layer and the adjacent layers on opposite sides of the separating layer, but not to crack elsewhere. After thermal normalization of such a capacitive structure, the capacitive structure can be then impregnated with wax, which tends to fill any crack between the separating layer and either of the adjacent layers, so as to prevent any ionic contaminants or other conductive contaminants from entering the crack and bridging the conductive, metallic masses providing electrical contacts.

These and other objects, features, and advantages of this invention are evident from the following description of a preferred embodiment of this invention with reference to the accompanying drawing.

DETAILED DESCRIPTION OF THE PREFERRED EMBODIMENT

Figure 1:
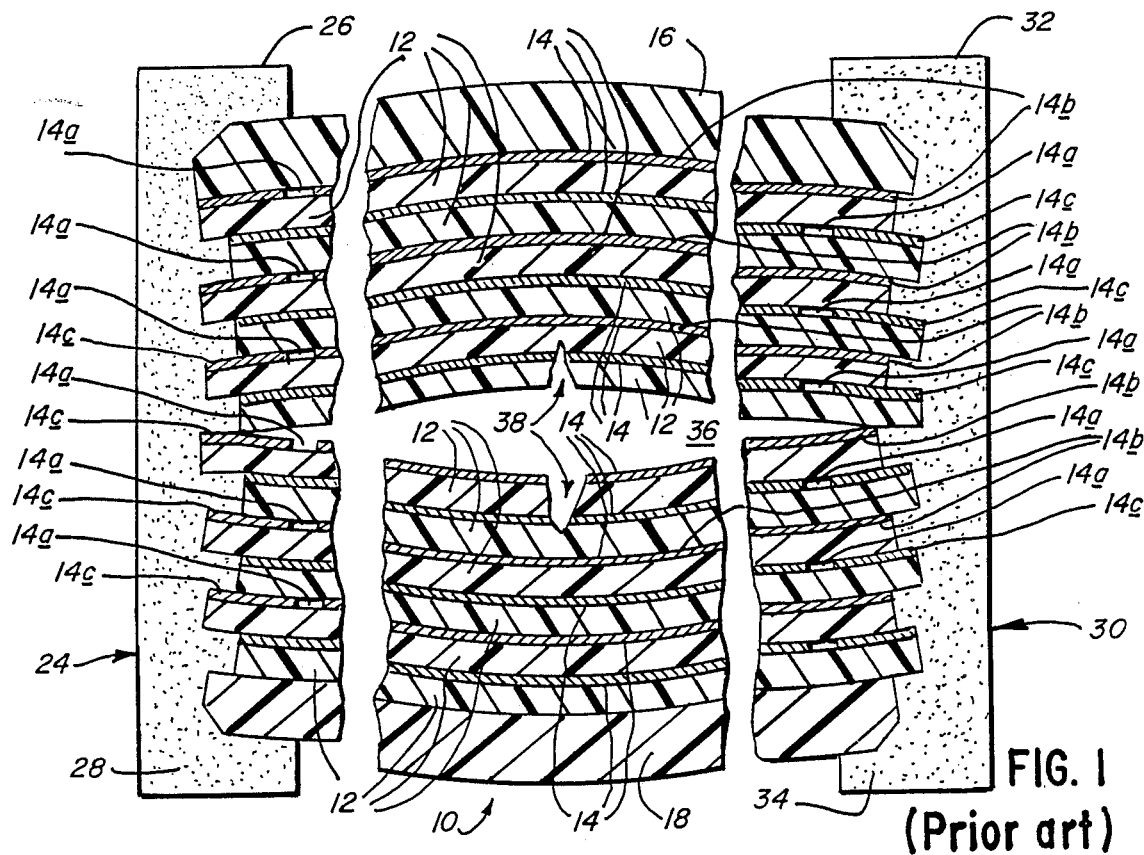
FIG. 1 is a greatly enlarged, cross-sectional view of a capacitive structure constituting prior art, portions of such structure being broken out for illustration purposes, and a crack being shown between two capacitive layers of such structure.

Before a detailed description is given of a capacitive structure constituting a preferred embodiment of this invention, it is useful to consider a capacitive structure exemplifying prior art, as shown in FIG. 1. As shown in FIG. 1, a capacitive structure 10 comprises a group of capacitive layers 12, each including a dielectric substrate with metallized areas covering the upper surface 14 of the dielectric substrate, except for a narrow, longitudinal, demetallized zones 14a dividing the metallized surface 14 into a relatively wide area 14b and a relatively narrow strip 14c. Alternate ones of the capacitive layers 12, which are of equal width, are offset laterally in relation to each other such that alternate ones of the capacitive layers 12 have their edges offset laterally in relation to the remaining layers. Thus indentations 20 are formed along the left edges of the capacitive layers 12, and indentations 22 are formed along the right edges of the capacitive layers 12. An upper cover 16 and a lower cover 18, each being a single, thicker plate of dielectric material, are provided respectively at the top and bottom surfaces of the group of capacitive layers 12. A conductive, metallic mass 24, which may be constituted by an inner layer of aluminum applied by a metal-spraying process, a middle layer of copper applied by a metal-spraying process, and an outer layer of eutectic tin and lead solder applied by a dipping process, covers the left edges of the capacitive layers 12 and covers the left edges of the upper cover 16 and the lower cover 18. The inner, middle, and outer layers of the mass 24 are not differentiated in FIG. 1. The mass 24 extends above the upper cover 16, so as to form an upper flange 26 bonding the upper cover 16 to the capacitive layers 12 at the left side of the capacitive structure 10. The mass 24 extends beneath the lower cover 18, so as to form a lower flange 28 bonding the lower cover 18 to the capacitive layers 12 at the left side of the capacitive structure 10. Similarly, a conductive, metallic mass 30 covers the right edges of the capacitive layers 12 as well as the right edges of the upper cover 16 and the lower cover 18. The mass 30 extends similarly above the upper cover 16, so as to form an upper flange 32, and below the lower cover 18, so as to form a lower flange 34. The upper flange 32 and the lower flange 34 bond the cover plates 16, 18, to the capacitive layers 12 at the right side of the capacitive structure 10. Each of the lower flanges 28, 34, also serves as a stand-off foot, which elevates the lower cover 18 in relation to a circuit board or other substrate (not shown) to which the capacitive structure 10 may be surface mounted.

As shown in FIG. 1, a crack 38 has formed between two of the capacitive layers 12, namely two inner layers of the capacitive structure 10. As shown, some of the capacitive layers 12 adjacent to the crack 36 have broken, so as to form breaks 38 along a breaking line tending to be generally perpendicular to the crack 36. The crack 36 and the breaks 38 have introduced unwanted variability into the capacitive property of the capacitive structure 10.

Figure 2:
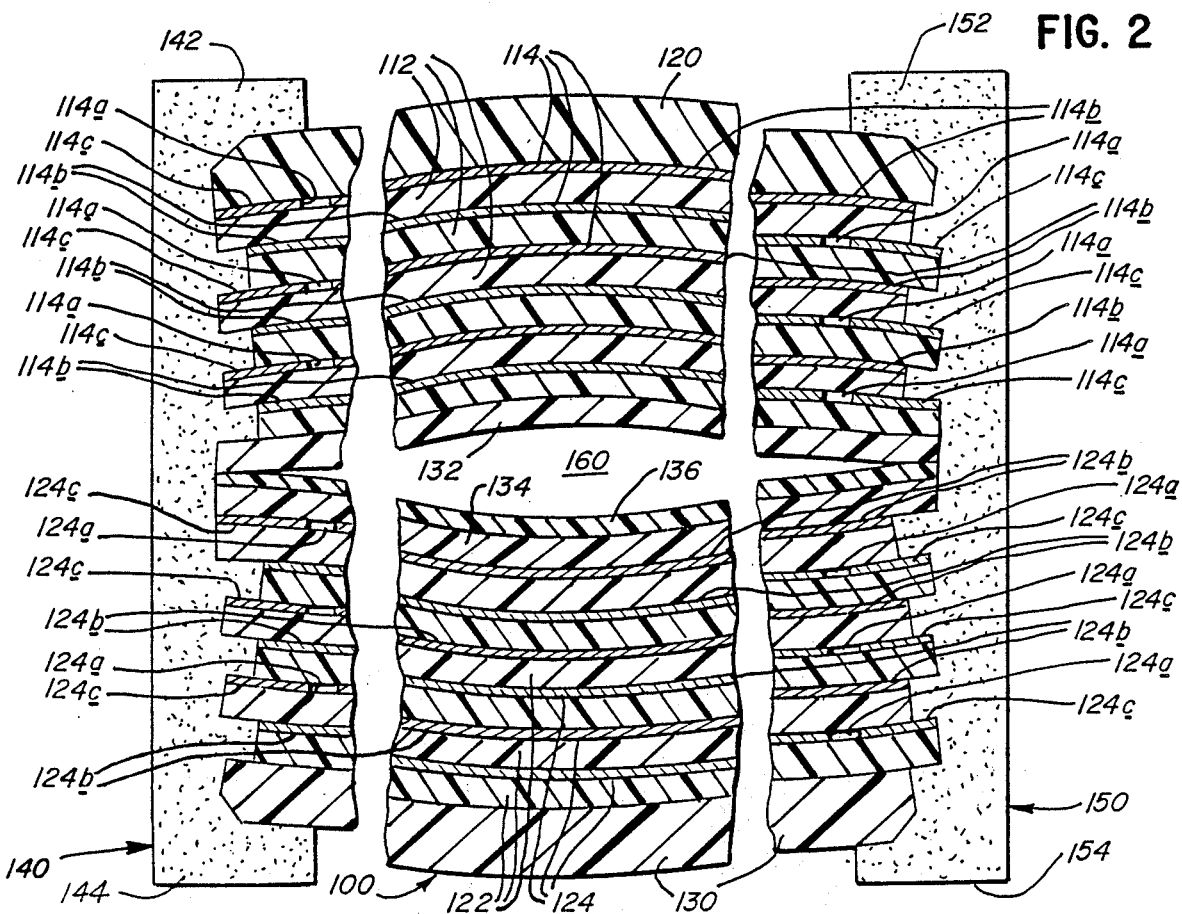
FIG. 2 is a similarly enlarged, cross-sectional view of a capacitive structure constituting a preferred embodiment of this invention, portions of such structure being broken out for illustration purposes, and a crack being shown along a separating layer of such structure.

In FIG. 2, a capacitive structure 100 constituting a preferred embodiment of this invention comprises an upper substructure 102 and lower substructure 104, is divided by an imaginary plane 106. The upper substructure comprises a group of capacitive layers 112, each including a dielectric substrate with metallized areas covering the upper surface 114 of the dielectric substrate, except for a narrow, longitudinal, demetallized zone 114a dividing the metallized surface 114 into a relatively wide area 114b and a relatively narrow strip 114. Alternate ones of the capacitive layers 112, which are of equal width, are offset laterally in relation to each other such that alternate ones of the capacitive layers 112 have their edges offset laterally in relation to the remaining layers 112. Thus, indentations 116 are formed along the left edges of the capacitive layers 112, and indentations 118 are formed along the right edges of the capacitive layers 112. An upper cover 120, which is a single, thicker plate of dielectric material, is provided at the top surface of the group of capacitive layers 112. The lower substructure 104 comprises a group of capacitive layers 122, which are similar to the capacitive layers 112, each of the capacitive layers 122 including a dielectric substrate with metallized areas covering the upper surface 124 of the dielectric substrate, except for a narrow, longitudinal, demetallized zone 124a dividing the metallized surface 124 into a relatively wide area 124b in a relatively narrow strip 124c. Alternate ones of the capacitive layers 122, which are of equal width, are offset laterally in relation to each other such that alternate ones of the capacitive layers 122 have their edges offset laterally in relation to the remaining layers 122. Thus, indentations 126 are formed along the left edges of the capacitive layers 122, and indentations 128 are formed along the right edges of the capacitive layers 122. A lower cover 130, which is similar to the upper cover 120, is provided at the bottom surface of the capacitive layers 122.

The upper substructure 102 is provided with an underlying layer 132 of non-metallized, dielectric material. The lower substructure 104 is provided with an overlying layer 134 of non-metallized, dielectric material. The overlying layer 134 is similar to the underlying layer 132 of the upper substructure 102, except that the overlying layer 134 of the lower substructure 104 is provided with a thin coat 136, which serves as a separating layer between the upper substructure 102 and the lower substructure 104, and which is made of a material that bonds less aggressively to the overlying layer 134 than the overlying layer 134 and the underlying layer 132 would bond to each other if the thin coat 136 were omitted, preferably a material containing polytetrafluoroethylene. The thin coat 136 may be conveniently applied by spraying a colloidal suspension of polytetrafluoroethylene in a liquid carrier containing a suitable binder, a preferred spray being Crown TM 6065 Permanent TFE Coating, as available commercially from Crown Industrial Products, of Hebron, Ill. Various oils and resins may be alternatively used. Preferably, so as to facilitate handling and loading, the underlying layer 132 of the upper substructure 102 and the overlying layer 134 of the lower substructure 104 have thicknesses of approximately 1 mil each. Thicker films may be more easily handled but unnecessarily add thickness and cost to the capacitive structure 100.

Preferably, the dielectric substrates of the capacitive layers 112, 122, are poly(ethylene terephthalate) film, and each of the aforementioned layers 132, 134, also is poly(ethylene terephthalate) film. Poly(ethylene terephthalate) film is preferred because of its dielectric properties and because of its ability to bond to itself and to the metallized areas on the capacitive layers 112, 122. Other dielectric materials may be alternatively used.

Although the aforesaid layers 132, 134, are shown as separate pieces, it is contemplated by this invention that such layers may be alternatively provided by a single piece, such as flattened tube of such film, in a suitable width when flattened, or a folded piece of such film, in a suitable width when folded. In either instance, each layer provided by flattening or folding may have a thin coat like the thin coat 136.

Moreover, it is contemplated by this invention that, rather than the thin coat 136 applied by spraying, as mentioned above, or otherwise on the overlying layer 134 of the lower substructure 104, one or more discrete layers containing polytetrafluoroethylene, preferably a single such layer, such as a film containing or consisting essentially of polytetrafluoroethylene, may be alternatively used as a separating layer between the upper substructure 102 and the lower substructure 104, whereupon the aforesaid layers 132, 134, or one of such layers 132, 134, may be entirely omitted. A suitable film is Teflon TM film from E. I. DuPont de Nemours & Company of Wilmington, Del. If both of such layers 132, 134, are omitted, or if one of such layers 132, 134, is omitted, a thin coat like the thin coat 136 may be directly applied by spraying, as noted above, or otherwise to the capacitive layer 112 lowermost in the upper substructure 102 or to the capacitive layer 122 uppermost in the lower substructure 104. It is preferable, whether the separating layer is provided by a thin coat like the thin coat 136 or by a discrete layer, to retain the overlying layer 134 of the lower substructure 102, since such layer 134 covers the metallized surface 124 of the capacitive layer 122 uppermost in the lower substructure 102. Such surface 124 would be otherwise exposed to any contaminants in any crack along the separating layer. Furthermore, as mentioned above, various oils and resins are useful instead of polytetrafluoroethylene.

A conductive, metallic mass 140, which may be advantageously constituted by an inner layer of aluminum applied by a metal-spraying process, a middle layer of copper applied by a metal-spraying process, and an outer layer of eutectic tin and lead solder applied by a dipping process, covers the left edges of the capacitive layers 112, the underlying layer 132 of the upper substructure 102, the overlying layer 134 of the lower substructure 104, and the capacitive layers 122, as well as the upper cover 120 and the lower cover 130. The inner, middle, and outer layers of the mass 140 are not differentiated in FIG. 2. The mass 140 extends above the upper cover 120 so as to form an upper flange 142 bonding the upper cover 120 to the capacitive layers 112. The mass 140 extends beneath the lower cover 130 so as to form a lower flange 144 bonding the lower cover 130 to the capacitive layers 112. A conductive, metallic mass 150, which may be similarly constituted, covers the right edges of the capacitive layers 112, the underlying layer 132 of the upper substructure 102, the overlying layer 134 of the lower substructure 104, and the capacitive layers 122, as well as the upper cover 120 and the lower cover 130. The mass 150 extends above the upper cover 120 so as to form an upper flange 152, and below the lower cover 130, so as to form a lower flange 154. Each of the lower flanges 144, 154, also serves as a stand-off foot, which elevates the lower cover 130 in relation to a circuit board or other substrate (not shown) to which the capacitive structure 100 may be surface mounted.

During and following thermal normalization, the capacitive structure 100 tends to crack preferentially between the separating layer provided by the thin coat 136 and the underlying layer 132 of the upper substructure 102, and possibly between the separating layer defined by the thin coat 136 and the overlying layer 134 of the lower substructure 104, but not to crack elsewhere. After thermal normalization of the capacitive structure 100, the capacitive structure 100 is impregnated with wax, which tends to fill any crack between the separating layer defined by the thin coat 136 and either of the adjacent layers, such as the crack 160 shown in FIG. 2 between the thin coat 136 and the underlying layer 132 of the upper substructure 102, so as to prevent any ionic contaminants or other conductive contaminants from entering the crack and bridging the conductive, metallic masses 140, 150. A suitable wax is Bee Square Amber TM wax, as available commercially from Petrolite Co., of Tulsa, Okla.

Herein, directional terms including "upper", "lower", "left", "right", "overlying", "underlying", "uppermost", and "lowermost", are referred o a capacitive structure in a convenient orientation, as shown in the drawing, but are not intended to limit this invention to any particular orientation.

Various modifications may be made in the capacitive structure provided by this invention without departing from the scope and spirit of this invention.

I claim:

1. A capacitive structure comprising an upper substructure and a lower substructure, each substructure comprising a plurality of capacitive layers laminated in stacked relation to one another, each capacitive layer having opposed first and second edges, each capacitive layer including a dielectric substrate and a metallized area, which covers a major portion of one surface of the dielectric substrate of such capacitive layer and which extends only to one of the first and second edges of such capacitive layer, the metallized areas on alternate ones of the capacitive layers in each substructure extending to opposite edges, the first edges of alternate ones of the capacitive layers in each such substructure extending beyond the first edges of the remainder of the capacitive layers in such substructure so as to form indentations along the first edges of such substructure, the second edges of alternate ones of the capacitive layers in each substructure extending beyond the second edges of the remainder of the capacitive layers of such substructure so as to form indentations along the second edges of such substructure, the capacitive structure further comprising at least one separating layer sandwiched between the upper and lower substructures, each such separating layer being made of a material bonding less aggressively to at least one of the upper and lower substructures than the upper and lower substructures would bond to each other if each such separating layer were omitted, the capacitive structure further comprising a first mass of conductive material covering and extending into the indentations formed along the first edges of the capacitive layers of the upper and lower substructures, so as to provide electrical connections to and between the metallized areas extending to the first edges of the capacitive layers of the upper and lower substructures, and a second mass of conductive material covering and extending into the indentations formed along the second edges of the capacitive layers of the upper and lower substructures, so as to provide electrical connections to and between the metallized areas extending to the second edges of the capacitive layers of the upper and lower substructures, the masses of conductive material bonding the capacitive layers of each substructure to one another and bonding the upper and lower substructures to each other with the separating layer sandwiched between the upper and lower substructures, whereby, if the capacitive structure is exposed to thermal stresses tending to cause some of the capacitive layers to delaminate from one another, the separating layer tends to separate from at least one of the upper and lower substructures, thereby substantially to alleviate such stresses, before any of the capacitive layers delaminate from one another.

2. The capacitive structure of claim 1 comprising a single such separating layer sandwiched between the upper and lower substructures.

3. The capacitive structure of claim 2 further comprising an intervening layer of dielectric material between the separating layer and one of the capacitive layers of one of the substructures.

4. The capacitive structure of claim 3 wherein the separating layer is provided by a thin coat applied to one surface of the intervening layer.

5. The capacitive structure of claim 4 wherein the intervening layer covers metallized areas on one surface of one of the capacitive layers of one of the substructures.

6. The capacitive structure of claim 2 wherein the upper substructure comprises an underlying layer of dielectric material, wherein the lower substructure comprises an overlying layer of dielectric material, and wherein the separating layer is sandwiched between the underlying layer of the upper substructure and the overlying layer of the lower substructure.

7. The capacitive structure of claim 6 wherein the separating layer is provided by a thin coat applied to one surface of a layer selected from the underlying layer of the upper substructure and the overlying layer of the lower substructure.

8. The capacitive structure of claim 2 wherein the dielectric substrate of each capacitive layer is dielectric, polyester film, wherein the upper substructure comprises an underlying layer of dielectric, polyester film, wherein the lower substructure includes an overlying layer of dielectric, polyester film, and wherein the separating layer contains polytetrafluoroethylene and is sandwiched between the underlying layer of the upper substructure and the overlying layer of the lower substructure.

9. The capacitive structure of claim 8 wherein the separating layer is provided by a thin coat supplied to one surface of a layer selected from the underlying layer of the upper substructure and the overlying layer of the lower substructure.

10. The capacitive structure of claim 2 wherein the dielectric substrate of each capacitive layer is dielectric, poly(ethylene terephthalate) film, wherein the upper substructure comprises an underlying layer of dielectric, poly(ethylene terephthalate) film, wherein the lower substructure includes an overlying layer of dielectric, poly(ethylene terephthalate) film, and wherein the separating layer contains polytetrafluoroethylene and is sandwiched between the underlying layer of the upper substructure and the overlying layer of the lower substructure.

11. The capacitive structure of claim 10 wherein the separating layer is provided by a thin coat applied to one surface of a layer selected from the underlying layer of the upper substructure and the overlying layer of the lower substructure.

12. The capacitive structure of claim 2 wherein the separating layer contains polytetrafluoroethylene.

13. The capacitive structure of claim 2 wherein the separating layer is provided by a thin coat applied to one surface of one of the overlying and underlying substructures.

14. The capacitive structure of claim 13 wherein the separating layer contains polytetrafluoroethylene.

15. The capacitive structure of claim 2 wherein the separating layer is a discrete layer containing polytetrafluoroethylene.

16. The capacitive structure of any preceding claim being impregnated with wax tending to fill any separation between the separating layer and either substructure.

* * * * *